(12) United States Patent
Lee et al.

(10) Patent No.: US 11,987,150 B2
(45) Date of Patent: May 21, 2024

(54) APPARATUS AND METHOD FOR MANAGING POWER OF FUEL CELL

(71) Applicant: HYUNDAI MOBIS Co., Ltd., Seoul (KR)

(72) Inventors: Yong Hee Lee, Yongin-si (KR); Hyo Jin Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 39 days.

(21) Appl. No.: 17/549,009

(22) Filed: Dec. 13, 2021

(65) Prior Publication Data

US 2023/0130727 A1    Apr. 27, 2023

(30) Foreign Application Priority Data

Oct. 22, 2021    (KR) .................. 10-2021-0141989

(51) Int. Cl.
| | | |
|---|---|---|
| *B60L 58/40* | (2019.01) | |
| *B60L 50/50* | (2019.01) | |
| *H01M 8/04858* | (2016.01) | |
| *H01M 10/0525* | (2010.01) | |
| *H01M 10/42* | (2006.01) | |

(Continued)

(52) U.S. Cl.
CPC .............. *B60L 58/40* (2019.02); *B60L 50/50* (2019.02); *H01M 8/0494* (2013.01); *H01M 10/0525* (2013.01); *H01M 10/425* (2013.01); *H01M 10/44* (2013.01); *H01M 10/46* (2013.01); *H01M 16/006* (2013.01); *H01M 2220/20* (2013.01); *H01M 2250/20* (2013.01)

(58) Field of Classification Search
CPC ...... B60L 58/40; B60L 50/50; H01M 8/0494; H01M 10/0525; H01M 10/425; H01M 10/44; H01M 10/46; H01M 16/006; H01M 2220/20; H01M 2250/20
USPC ........................................................ 307/10.1
See application file for complete search history.

(56) References Cited

U.S. PATENT DOCUMENTS

2006/0279903 A1    12/2006 Togashi et al.
2009/0186256 A1 *    7/2009 Lida ........................ F17C 5/007
                                                                       429/515

(Continued)

FOREIGN PATENT DOCUMENTS

JP          2006-351642 A     12/2006
KR    10-2011-0069398 A      6/2011

(Continued)

OTHER PUBLICATIONS

Extended European Search Report issued in corresponding European Patent Application No. 21214220.2 dated Jun. 20, 2022.

(Continued)

*Primary Examiner* — Hal Kaplan
*Assistant Examiner* — Swarna N Chowdhuri
(74) *Attorney, Agent, or Firm* — MORGAN, LEWIS & BOCKIUS LLP

(57) ABSTRACT

An apparatus for managing power of a fuel cell is provided. The apparatus includes a power conversion device that converts a high voltage into a low voltage and supplies the converted low voltage to a low voltage battery, a cooling device that flows coolant to cool the power conversion device, and a controller that controls driving of the power conversion device and the cooling device based on the remaining state of charge (SOC) of the low voltage battery.

16 Claims, 7 Drawing Sheets

(51) Int. Cl.
*H01M 10/44* (2006.01)
*H01M 10/46* (2006.01)
*H01M 16/00* (2006.01)

(56) References Cited

U.S. PATENT DOCUMENTS

| | | | |
|---|---|---|---|
| 2013/0030622 A1 | 1/2013 | Park et al. | |
| 2014/0104750 A1 | 4/2014 | Ahn et al. | |
| 2015/0084410 A1 | 3/2015 | Park et al. | |
| 2015/0328991 A1* | 11/2015 | Roh | B60L 58/00 701/22 |
| 2016/0006059 A1* | 1/2016 | Kwon | B60L 58/40 429/442 |
| 2018/0035545 A1 | 2/2018 | Lee et al. | |
| 2018/0342747 A1 | 11/2018 | Kim | |
| 2019/0232753 A1* | 8/2019 | Martell | B60H 1/322 |
| 2022/0093947 A1* | 3/2022 | Hosoi | B60L 50/72 |

FOREIGN PATENT DOCUMENTS

| | | |
|---|---|---|
| KR | 10-1376839 B1 | 3/2014 |
| KR | 10-2014-0079129 A | 6/2014 |
| KR | 10-2015-0067576 A | 6/2015 |
| KR | 10-2015-0116661 A | 10/2015 |
| KR | 10-2018-0012629 A | 2/2018 |
| KR | 10-2019-0069923 A | 6/2019 |
| KR | 10-2021-0014818 A | 2/2021 |

OTHER PUBLICATIONS

Office Action issued in corresponding Korean Patent Application No. 10-2021-0141989 dated Oct. 27, 2022.

Office Action issued in corresponding Korean Application No. 10-2021-0141989 dated Apr. 14, 2023, with English translation.

* cited by examiner

APPARATUS AND METHOD FOR MANAGING POWER OF FUEL CELL

CROSS-REFERENCE TO RELATED APPLICATION

This application claims the benefit of priority to Korean Patent Application No. 10-2021-0141989, filed in the Korean Intellectual Property Office on Oct. 22, 2021, the entire contents of which are incorporated herein by reference.

TECHNICAL FIELD

The present disclosure relates to an apparatus and a method for managing power of a fuel cell.

BACKGROUND

In general, a bidirectional high voltage DC-DC converter (BHDC) package includes a BHDC and a low voltage DC-DC converter (LDC).

The BHDC plays a role in boosting a voltage of a high voltage battery and delivering the boosted voltage to a high voltage junction box and plays a role in dropping electrical energy regenerated from a motor of the vehicle when charging the high voltage battery with the electrical energy regenerated from the motor of the vehicle. The LDC decreases a high voltage output from a fuel cell stack or the BHDC to 12 V to charge a low voltage battery. Because the low voltage battery supplies power to low voltage drive devices in the vehicle, including fuel cell system driving devices, the amount of charging of the low voltage battery should be ensured above a certain amount or more before the driver starts the vehicle.

A high voltage formed in the high voltage battery is used to drive an electrical balance of plant (E-BOP) to turn on a fuel cell and is used to charge the low voltage battery by means of the LDC at the same time.

Thus, when the amount of charging of the low voltage battery is insufficient, power fast moves from the high voltage battery to the low voltage battery at the same time as turning on a high voltage system. At this time, because power movement first occurs irrespective of turning on the fuel cell, the BHDC is heated in a situation where a required power of the E-BOP is not expected in a stand-by step.

SUMMARY

The present disclosure has been made to solve the above-mentioned problems occurring in the prior art while advantages achieved by the prior art are maintained intact.

An aspect of the present disclosure provides an apparatus and a method for managing power of a fuel cell to enhance unnecessary power movement between a fuel cell system and a high voltage battery, which occurs in the starting sequence of a fuel cell vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for managing power of a fuel cell may include a power conversion device that converts a high voltage into a low voltage and supplies the converted low voltage to a low voltage battery, a cooling device that flows coolant to cool the power conversion device, and a controller that controls driving of the power conversion device and the cooling device based on the remaining state of charge (SOC) of the low voltage battery.

In an embodiment, the power conversion device may include a bidirectional high voltage DC-DC converter (BHDC) that drops a regenerative power to charge a high voltage battery or boosts a power of the high voltage battery to supply the boosted power to an electrical load and a low voltage DC-DC converter (LDC) that converts an output power of the BHDC into a low voltage to charge the low voltage battery.

In an embodiment, the controller may control to drive a low voltage electrical balance of plant (E-BOP) of a vehicle, when an amount of charging of a hydrogen tank is greater than a certain remaining amount when the vehicle is started.

In an embodiment, the controller may drive the BHDC and may drive the LDC to charge the low voltage battery when a voltage at an input terminal of the LDC is higher than a certain voltage and when a remaining SOC of the high voltage battery is greater than a certain range.

In an embodiment, the controller may drive the BHDC and may drive the LDC to charge the low voltage battery when a voltage at an input terminal of the LDC is higher than a certain voltage, when a remaining SOC of the high voltage battery is less than a certain range, and when the remaining SOC of the low voltage battery is less than the certain range.

In an embodiment, the controller may first drive the cooling device before driving the LDC.

In an embodiment, the controller may drive the BHDC and may drive a fuel cell stack when a voltage at an input terminal of the LDC is higher than a certain voltage, when a remaining SOC of the high voltage battery is less than a certain range, and when the remaining SOC of the low voltage battery is greater than the certain range.

In an embodiment, the controller may drive the fuel cell stack, may drive the LDC, and may control such that an SOC of the low voltage battery is maintained in the certain range.

According to another aspect of the present disclosure, a method for managing power of a fuel cell may include controlling driving of a power conversion device that converts a high voltage into a low voltage and supplies the converted low voltage to a low voltage battery and driving of a cooling device that flows coolant to cool the power conversion device, based on a remaining SOC of the low voltage battery.

In an embodiment, the method may further include dropping, by a BHDC, a regenerative power to charge a high voltage battery or boosting, by the BHDC, a power of the high voltage battery to supply the boosted power to an electrical load and converting, by an LDC, an output power of the BHDC into a low voltage to charge the low voltage battery.

In an embodiment, the method may further include controlling to drive a low voltage E-BOP of a vehicle, when an amount of charging of a hydrogen tank is greater than a certain remaining amount when the vehicle is started.

In an embodiment, the method may further include driving the BHDC and driving the LDC to charge the low voltage battery when a voltage at an input terminal of the LDC is higher than a certain voltage and when a remaining SOC of the high voltage battery is greater than a certain range.

In an embodiment, the method may further include driving the BHDC and driving the LDC to charge the low voltage battery when a voltage at an input terminal of the LDC is higher than a certain voltage, when a remaining SOC of the high voltage battery is less than a certain range, and when the remaining SOC of the low voltage battery is less than the certain range.

In an embodiment, the method may further include first driving the cooling device before driving the LDC.

In an embodiment, the method may further include driving the BHDC and driving a fuel cell stack, when a voltage at an input terminal of the LDC is higher than a certain voltage when a remaining SOC of the high voltage battery is less than a certain range, and when the remaining SOC of the low voltage battery is greater than the certain range.

In an embodiment, the method may further include driving the fuel cell stack and driving the LDC such that an SOC of the low voltage battery is maintained in the certain range.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
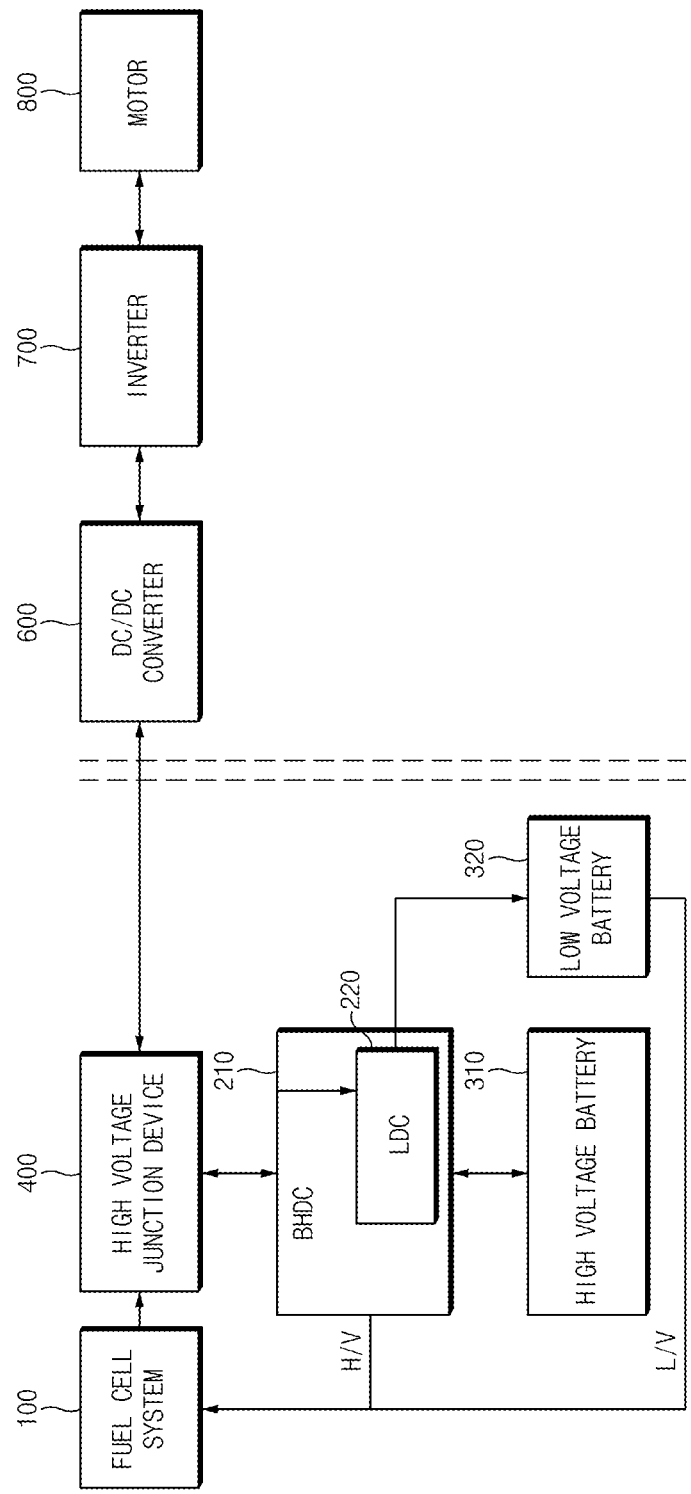
FIG. 1 is a block diagram illustrating a driving system mounting a fuel cell according to an embodiment of the present disclosure.

Hereinafter, various embodiments of the disclosure will be described with reference to accompanying drawings. However, it should be understood that this is not intended to limit the present disclosure to specific implementation forms and includes various modifications, equivalents or alternatives of embodiments of the present disclosure.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of the expressions "A or B," "at least one of A and B," "at least one of A or B," "A, B, or C," "at least one of A, B, and C," and "at least one of A, B, or C," may include any and all combinations of one or more of the items listed together with a corresponding expression among the expressions.

Such terms as "1st" and "2nd," or "first" and "second" may be used to simply distinguish a corresponding component from another, and does not limit the components in other aspect (e.g., importance or order). It is to be understood that if any (e.g., a first) component is referred to, with or without the term "operatively" or "communicatively", as "coupled with," "coupled to," "connected with," or "connected to" another (e.g., a second) component, it means that the element may be coupled with the other element directly (e.g., wiredly), wirelessly, or via a third component.

Figure 2:
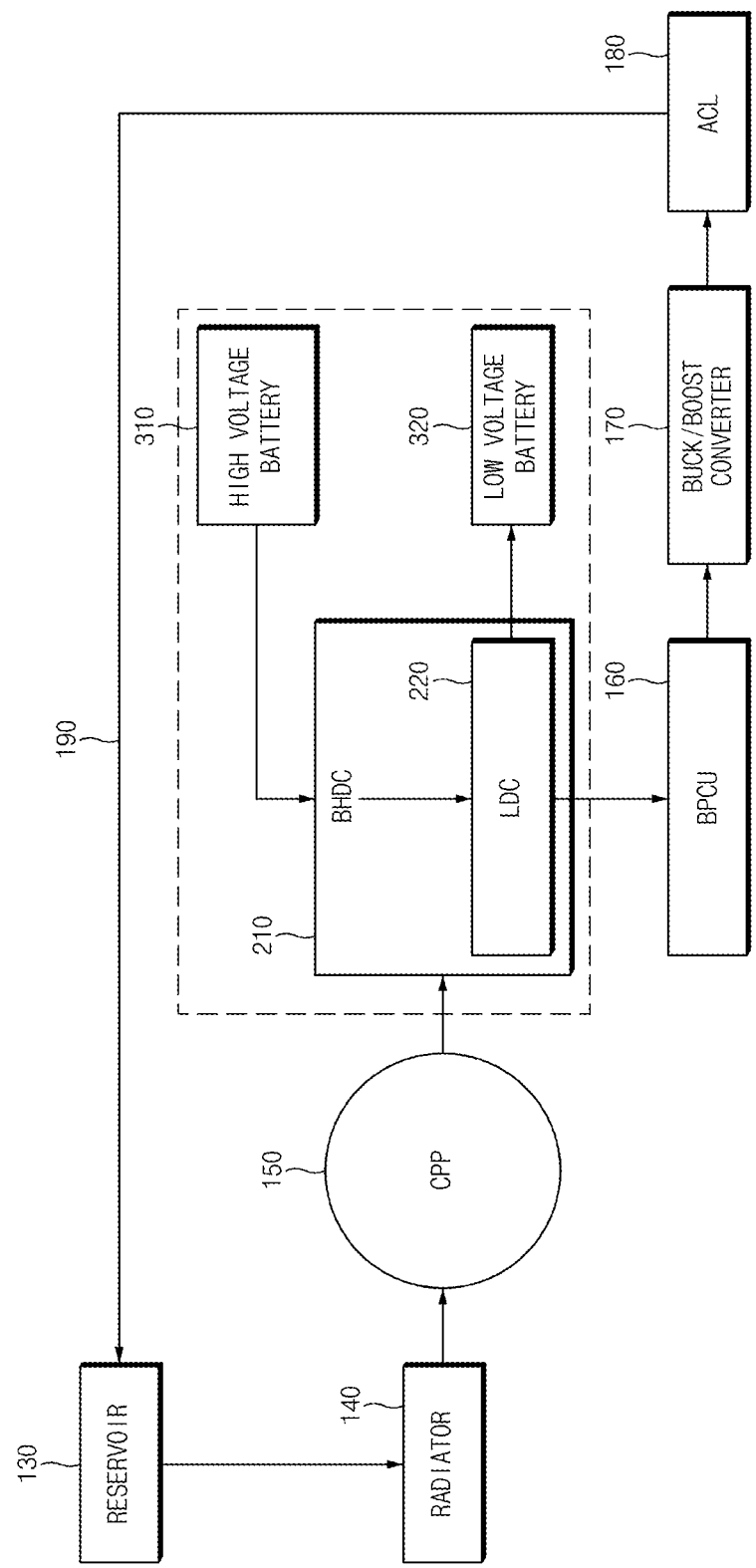
FIG. 2 is a drawing illustrating a cooling process of a driving system mounting a fuel cell according to an embodiment of the present disclosure.
Figure 3:
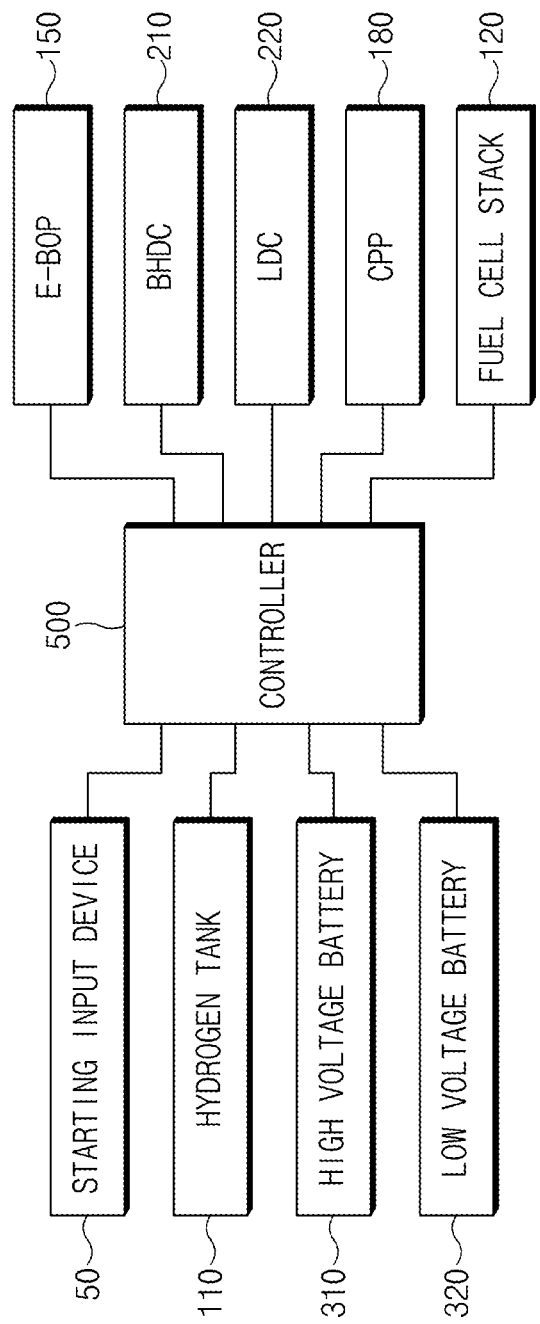
FIG. 3 is a block diagram illustrating an apparatus for managing power of a fuel cell according to an embodiment of the present disclosure.
Figure 4:
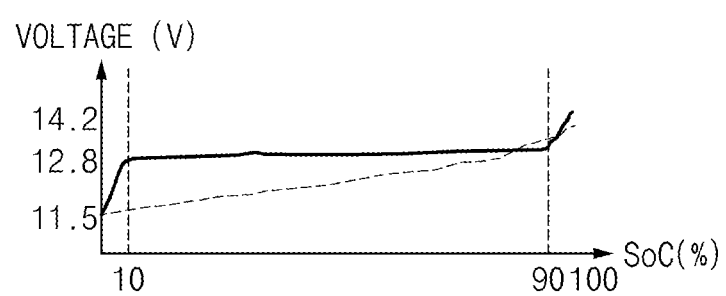
FIG. 4 is a drawing illustrating a charging characteristic of a battery making up an apparatus for managing power of a fuel cell according to an embodiment of the present disclosure.

FIG. 1 is a block diagram illustrating a driving system mounting a fuel cell according to an embodiment of the present disclosure. FIG. 2 is a drawing illustrating a cooling process of a driving system mounting a fuel cell according to an embodiment of the present disclosure. FIG. 3 is a block diagram illustrating an apparatus for managing power of a fuel cell according to an embodiment of the present disclosure. FIG. 4 is a drawing illustrating a charging characteristic of a battery making up an apparatus for managing power of a fuel cell according to an embodiment of the present disclosure.

Referring to FIGS. 1 to 3, the driving system mounting the fuel cell may be configured including a fuel cell system 100, a power conversion device 200, a high voltage battery 310, a low voltage battery 320, a high voltage junction device 400, a DC/DC converter 600, an inverter 700, and a motor 800.

The fuel cell system 100 may be a kind of power generation system which generates the chemical energy of fuel as power by means of electrochemical reaction of hydrogen and oxygen (oxygen in air) in a fuel cell stack 120. The fuel cell system 100 may include the fuel cell stack 120 which is composed of an anode and a cathode to generate power, a hydrogen supply device (not shown) for supplying hydrogen stored in a hydrogen tank 110 to the anode, and an air supply device (not shown) for supplying air to the cathode.

By means of such a configuration, the fuel cell system 100 may react hydrogen as fuel with oxygen in the air to generate electricity and may discharge heat and water as reaction by-products.

The power conversion device 200 may include a bidirectional high voltage DC/DC converter (BHDC) 210 and a low voltage DC/DC converter (LDC) 220.

The BHDC 210 may play a role in boosting a voltage of the high voltage battery 310 and delivering the boosted voltage to the high voltage junction device 400 and may play a role in dropping power regenerated from the motor 800 when charging the high voltage battery 310 with the power regenerated from the motor 800. The BHDC 210 may supply power to electrical loads such as the DC/DC converter 600, the inverter 700, and the motor 800 through the high voltage junction device 400.

The LDC 220 may be a unidirectional DC/DC converter. The LDC 220 may convert an output voltage of the fuel cell stack 120 or an output voltage of the BHDC 210 into a low voltage of 12V to charge the low voltage battery 320 and may supply energy to an electrical balance of plant (E-BOP) 60 making up a fuel cell vehicle.

The LDC 220 may operate in a boost mode of boosting a low voltage applied from the low voltage battery 320 and applying a high voltage to each component of the high voltage battery 310, when the fuel cell vehicle is started, and may start the fuel cell vehicle. Except when the fuel cell vehicle is started, the LDC 220 may operate in a buck mode for dropping a high voltage applied from the high voltage battery 310 to charge the low voltage battery 320 or supplying a voltage to the E-BOP 60 in the fuel cell vehicle. The LDC 220 may operate in the boost mode or the buck mode by means of a buck/boost converter 170.

The high voltage battery 310 may be a large capacity lithium-ion battery and may allow the fuel cell vehicle to be operated only with the power of the high voltage battery 310 in an electric vehicle (EV) mode. A voltage supplied from the high voltage battery 310 may be boosted to 250 V to 400 V by the BHDC 210 and may then be supplied to the electrical load through the high voltage junction device 400.

In addition, there may be two paths for supplying high voltage power to the electrical load. As a first case, when the fuel cell vehicle is started and the fuel cell stack 120 operates, power produced by the fuel cell stack 120 may be boosted to 250 V to 400 V by the BHDC 210 and may then be supplied to the electrical load through the high voltage junction device 400. As a second case, power charged in the high voltage battery 310 may be boosted to 250 V to 400 V by the BHDC 210 and may then be supplied to the electrical load through the high voltage junction device 400, without using the power of the fuel cell stack 120.

The low voltage battery 320 may be a lithium-ion battery and may be changed by a low voltage input from the LDC 220.

The low voltage battery 320 may act as a driving energy source of the E-BOP 60 such as a vehicle interior air conditioning device and may simultaneously act as power sources of important controllers of the fuel cell system 100, for example, a fuel cell control unit (FCU) and a motor control unit (MCU), and may play an essential role in initial driving of the fuel cell vehicle.

Because the low voltage battery 320 supplies power to low power drive devices in the fuel cell vehicle, including driving devices of the fuel cell system 100, the amount of charging of the low voltage battery 320 should be ensured above a certain amount before the fuel cell vehicle is started.

The high voltage junction device 400 may receive power from the fuel cell system 100 and the BHDC 210 and may distribute a high voltage to an electrical load which needs the high voltage.

The DC/DC converter 600 may convert an output voltage of the fuel cell system 100 or an output voltage of the BHDC 210, which is delivered through the high voltage junction device 400, into a low voltage.

The inverter 700 may convert the DC power delivered through the DC/DC converter 600 into AC power capable of driving the motor 800.

The motor 800 may be provided in front wheels or rear wheels of the fuel cell vehicle, and may be electrically connected with a motor reducer through the inverter 700 to drive the fuel cell vehicle.

Meanwhile, being first performed in a starting sequence of the fuel cell system 100 is forming a high voltage. The formed high voltage may be used to drive the E-BOP 60 for starting the fuel cell system 100 and may be simultaneously used to charge the low voltage battery 320 through the LDC 220.

When the amount of charging of the low voltage battery 320 is insufficient, power may fast move from the high voltage battery 310 to the low voltage battery 320 at the same time as forming the high voltage. In this case, when power movement occurs from the high voltage battery 310 to the low voltage battery 320 irrespective of starting of the fuel cell system 100, although the E-BOP 60 is not driven in a starting preparation step of the fuel cell system 100, heating may occur in the BHDC 210.

Thus, a cooling device through which coolant flows should be driven before the starting of the fuel cell system 100 to cool power electronics PE in which heating occurs.

Meanwhile, referring to FIG. 2, as the temperature of coolant cooling the PE in which the heating occurs increases and the coolant, the temperature of which increases, flows along a cooling path 190, a blower power control unit (BPCU) 160, the buck/boost converter 170, an air cooler (ACL) 180, and the like, including the BHDC 210, the LDC 220, the high voltage battery 310, and the low voltage battery 320, may increase in temperature.

The cooling device may be configured including a reservoir 130, a radiator 140, and a coolant power-electric cooling pump (CPP) (150).

The reservoir 130 may be a water tank which stores coolant circulating along the cooling path 190. The radiator 140 may cool coolant, the temperature of which increases while flowing along the cooling path 190, by means of heat exchange with the air. The CPP 150 may provide a driving force such that coolant stored in the reservoir 130 is circulated to the fuel cell system 100, the PE, and the like through the cooling path 190.

The cooling device having such a configuration may circulate coolant cooled in the radiator 140 by means of an operation of the CPP 150 along the cooling path 190, thus cooling the fuel cell system 100 and the PE not to overheat. The cooling device may include a thermal management system (TMS).

When coolant heated by cooling the PE before starting of the fuel cell system 100 flows to the fuel cell system 100, the fuel cell system 100 may fail to be stably started when it is started.

When the low voltage battery 320 should be charged through the LDC 220, the controller 500 may block flow of current for charting the low voltage battery 320 from the LDC 220 before starting the fuel cell system 100, thus preventing the PE from being heated.

Referring to FIG. 4, because the low voltage battery 320 is a lithium-ion polymer battery, a battery voltage characteristic according to a state of charge (SoC) is steady. In other words, the voltage value may be maintained although the amount of charge is insufficient a lot, and power for starting the fuel cell system 100 may be sufficient although it reaches near an overdischarge limit.

When the low voltage battery 320 has only the amount of charging enough to drive the low voltage E-BOP 60, the controller 500 may control such that the low voltage battery 320 is not charged before starting of the fuel cell system 100. The controller 500 may include a hydrogen management system (HMU), a vehicle control unit (VCU), a fuel cell control unit (FCU), a motor control unit (MCU), or the like.

When ignition for preparing for starting is performed by means of a starting input device 50 of the fuel cell vehicle, the controller 500 may determine that the low voltage battery 320 is not discharged. Thus, the controller 500 may control such that the low voltage battery 320 is not charged.

Next, the controller 500 may determine that it is able to drive the fuel cell vehicle using power by the fuel cell system 100 and may identify the amount of hydrogen charging of the hydrogen tank 110.

When the amount of hydrogen charging (e.g., a state of fuel (SOF)) of the hydrogen tank 110 is greater than or equal to 20%, the controller 500 may determine that it is able to drive the fuel cell system 100. Because it is able to drive the fuel cell system 100 using the amount of hydrogen charging of the hydrogen tank 110, the controller 500 may maintain a state where the low voltage battery 320 is not discharged.

As the ignition is performed by means of the starting input device 50, the controller 500 may identify a state where power of the low voltage battery 320 is applied to the E-BOP 60 of the fuel cell vehicle.

Next, the controller 500 may drive the high voltage battery 310 and may control such that a high voltage output from the high voltage battery 310 is applied to the BHDC 210.

Meanwhile, the controller 500 may determine that it is able to drive the fuel cell vehicle using power stored in the high voltage battery 310 or may drive the high voltage battery 310 to control such that a high voltage output from the high voltage battery 310 is applied to the BHDC 210 when the amount of hydrogen (e.g., the SOF) of the hydrogen tank 110 is less than 20%.

When the high voltage output from the high voltage battery 310 is applied to the BHDC 210, the power of the high voltage battery 310 may be boosted to conform to power output from the fuel cell system 100. In this case, the fuel cell system 100 may be in a state where it is not driven, and the high voltage battery 310 and the low voltage battery 320 may be in a state where they are driven.

In this case, the controller 500 may maintain the state where the low voltage battery 320 is not charged.

Next, the controller 500 may identify voltage at an input terminal of the LDC 220. The voltage at the input terminal of the LDC 220 and an output voltage of the BHDC 210 should be the same as each other. Thus, only when the voltage at the input terminal of the LDC 220 is greater than 300 V, the controller 500 may determine that it is normal. When the voltage at the input terminal of the LDC 220 is less than 300 V, the controller 500 may determine that the amount of charging of the high voltage battery 310 is insufficient or that the state of the high voltage battery 310 is bad.

When the voltage at the input terminal of the LDC 220 is greater than 300 V, the controller 500 may determine that the state of the high voltage battery 310 is normal and may identify the amount of charging of the high voltage battery 310.

When the amount of charging of the high voltage battery 310 is greater than 85%, because the controller 500 is able to drive the fuel cell vehicle using the power of the high voltage battery 310 without driving the fuel cell system 100, it may drive the LDC 220 to control such that the low voltage battery 320 is charged. In this case, the charging speed of the low voltage battery 320 may be 10 A per second.

When the amount of charging of the high voltage battery 310 is less than 85%, the controller 500 may identify the amount of charging of the low voltage battery 320.

When the amount of charging of the low voltage battery 320 is greater than 10%, because the controller 500 is able to drive the E-BOP 60 although not charging the low voltage battery 320, it may maintain a state where the low voltage battery 320 is not charged. In this case, as the low voltage battery 320 is not charged, because the low voltage battery 320 is not heated, the controller 500 may fail to drive a cooling device.

When the amount of charging of the low voltage battery 320 is less than 10%, the controller 500 may drive the LDC 220 to control such that the low voltage battery 320 is charged. In this case, the charging speed of the low voltage battery 320 may be 10 A per second. Because the low voltage battery 320 is heated when the low voltage battery 320 is charged due to the driving of the LDC 220, the controller 500 may drive the cooling device to the maximum before driving the LCD 220.

Next, the controller 500 may drive the fuel cell system 100. When the fuel cell system 100 is driven, because power is sufficiently generated in the fuel cell system 100, the controller 500 may drive the LDC 220 to control such that the low voltage battery 320 is charged. In this case, the charging speed of the low voltage battery 320 may be 5A per second.

The controller 500 may drive the LDC 220 while the fuel cell vehicle is traveling to control such that the low voltage battery 320 is charged while the amount of charging of the low voltage battery 320 is maintained as 80% to 85%.

Figure 5:
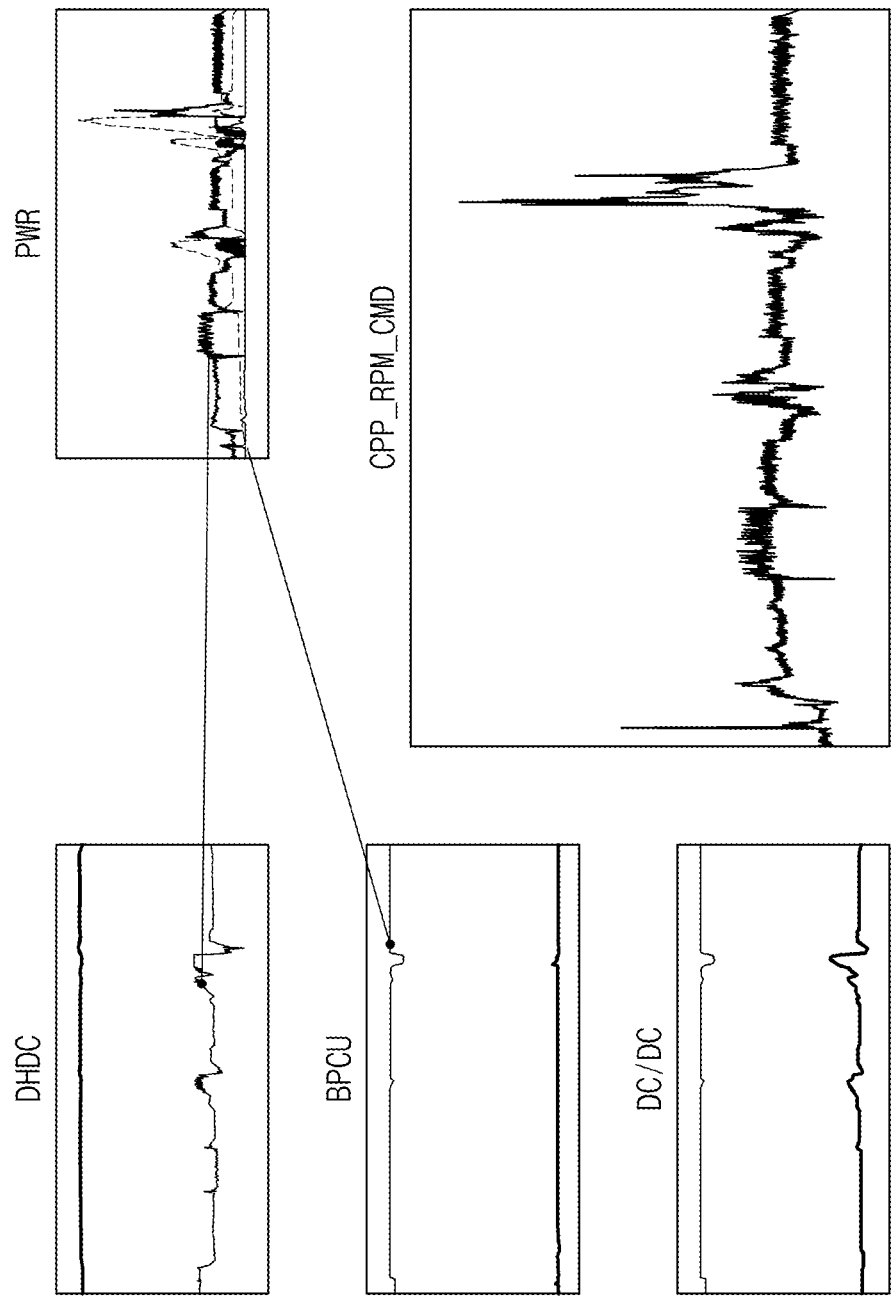
FIGS. 5 and 6 are drawings illustrating a noise reduction state by means of an apparatus for managing power of a fuel cell according to an embodiment of the present disclosure.
Figure 6:
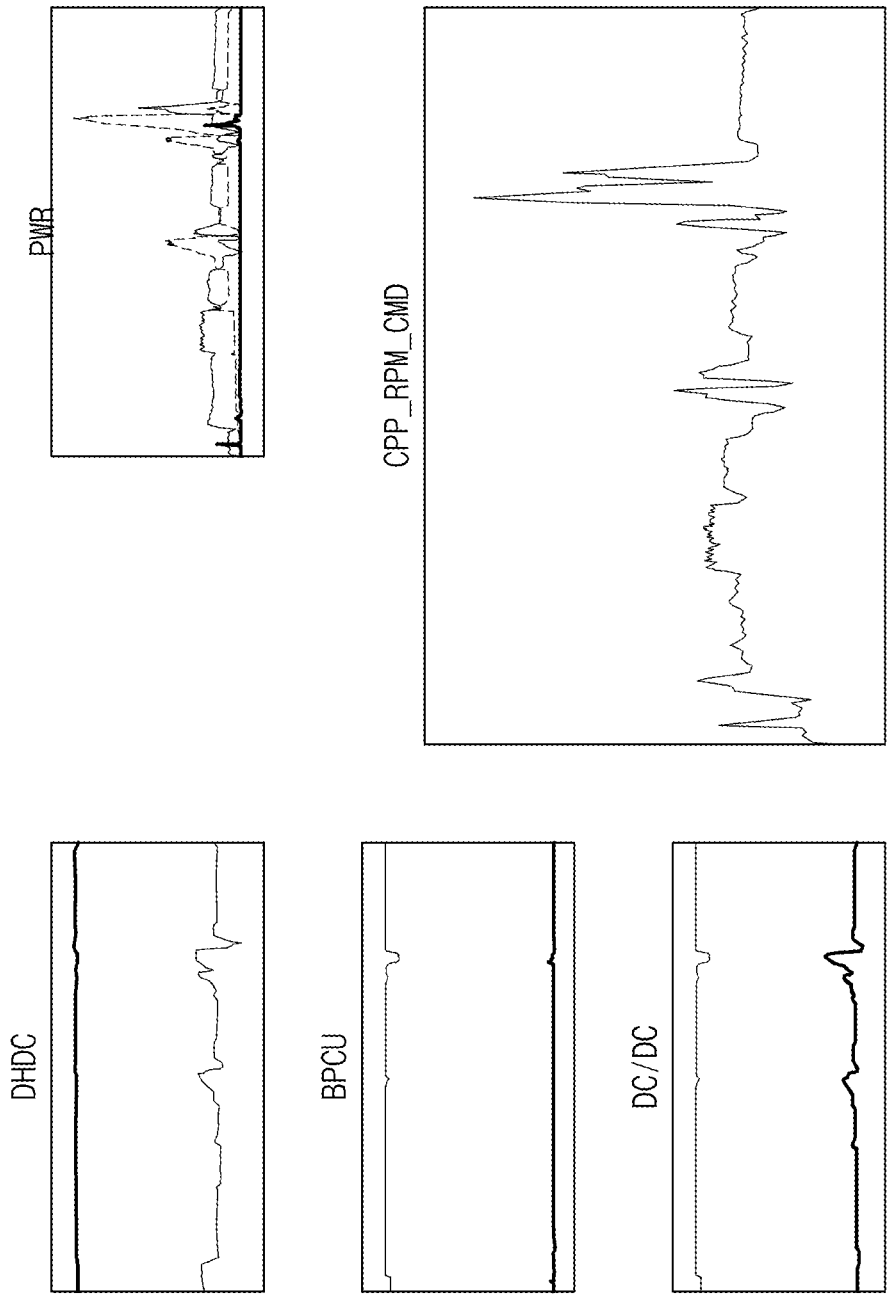

FIGS. 5 and 6 are drawings illustrating a noise reduction state by means of an apparatus for managing power of a fuel cell according to an embodiment of the present disclosure.

Referring to FIG. 5, in the process of starting a fuel cell system 100 of FIG. 1, when power movement occurs from a high voltage battery 310 of FIG. 3 to a low voltage battery 320 of FIG. 3, as the cooling device is driven because a BHDC 210 of FIG. 3 is heated although an E-BOP 60 of FIG. 3 is not driven, it may be seen that a lot of noise is generated.

However, referring to FIG. 6, in the process of starting the fuel cell system 100, when power movement does not occur from the high voltage battery 310 to the low voltage battery 320, because the cooling device is not driven as the BHDC 210 is not heated, it may be seen that noise is relatively reduced.

In addition, a controller 500 of FIG. 3 may control at least one other component (e.g., a hardware or software component) of the apparatus for managing the power of the fuel cell and may perform a variety of data processing or calculation.

According to an embodiment, as at least a portion of data processing or calculation, the controller 500 may store commands or data received from another component (e.g., the sensor) in a volatile memory, may process the commands or data stored in the volatile memory, and may store result data in a non-volatile memory.

According to an embodiment, the controller 500 may include a main processor (e.g., a central processing unit or an application processor) or an auxiliary processor (e.g., a graphics processing unit, an image signal processor, a sensor hub processor, a communication processor) operable independently or together with it. For example, the auxiliary processor may be configured to, when the controller 500 includes the main processor and the auxiliary processor, use lower power than the main processor or specialize in a specified function. The auxiliary processor may be implemented independently of the main processor or as a part thereof.

Although not illustrated in the drawing, according to embodiments, the apparatus for managing the power of the fuel cell may further include a storage.

The storage may store an instruction controlling the apparatus for managing the power of the fuel cell, a control instruction code, control data, or user data. For example, the storage may include at least one of an application program, an operating system (OS), middleware, or a device driver.

The storage may include one of a volatile memory or a non-volatile memory.

The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like.

The non-volatile memory may include a read only memory (ROM), a programmable ROM (PROM), an electrically programmable ROM (EPROM), an electrically erasable programmable ROM (EEPROM), a flash memory, or the like.

The storage may further include a non-volatile medium such as a hard disk drive (HDD), a solid state disk (SSD), an embedded multimedia card (eMMC), or a universal flash storage (UFS).

Hereinafter, a description will be given in detail of a method for managing power of a fuel cell according to another embodiment of the present disclosure with reference to FIG. 7.

Figure 7:
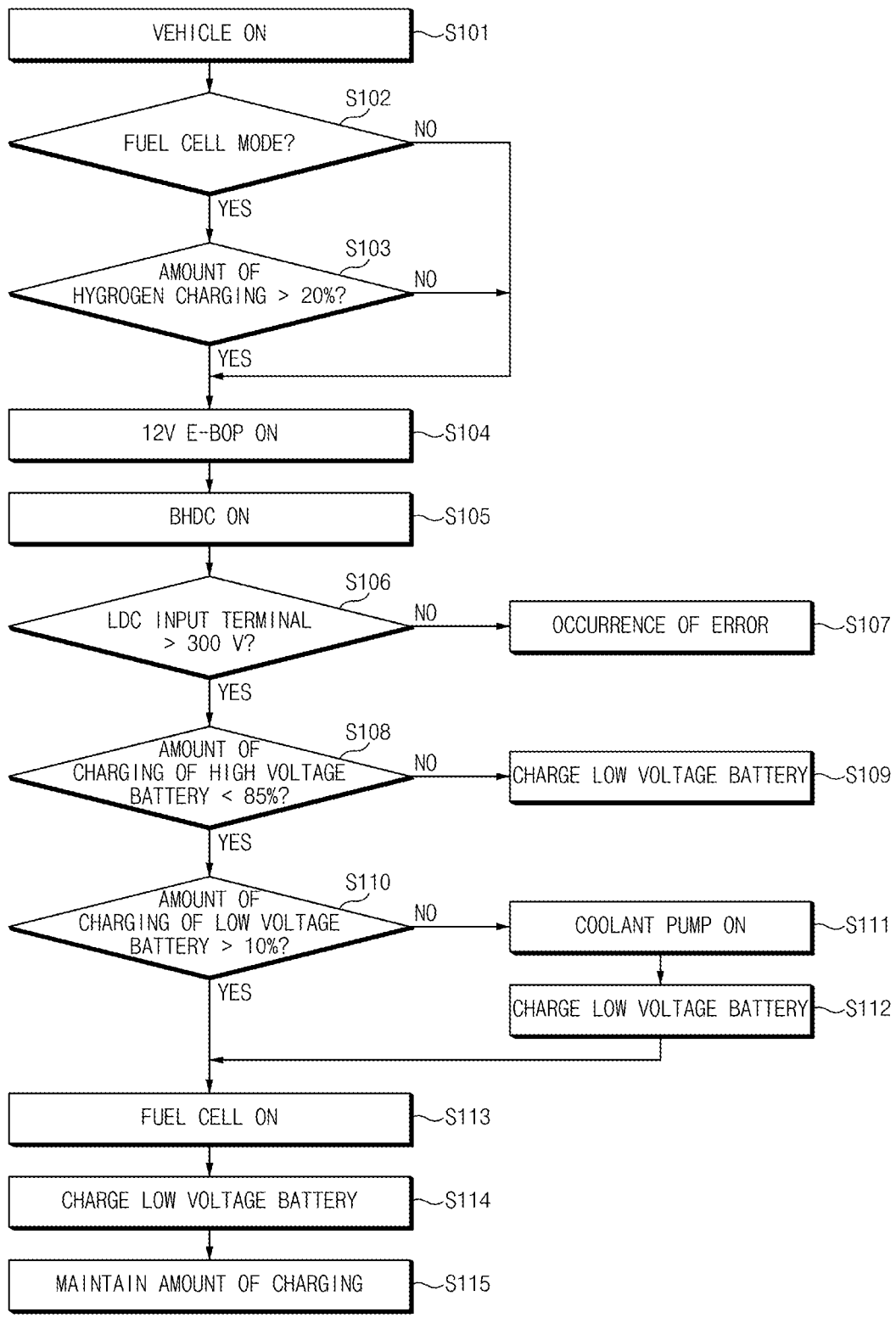
FIG. 7 is a flowchart illustrating a method for managing power of a fuel cell according to an embodiment of the present disclosure.

FIG. 7 is a flowchart illustrating a method for managing power of a fuel cell according to an embodiment of the present disclosure.

Hereinafter, it is assumed that an apparatus for managing power of a fuel cell in FIG. 3 performs a process of FIG. 7.

First of all, when ignition which prepares for starting is performed by means of a starting input device 50 of a fuel cell vehicle in S101, in S102, a controller 500 of FIG. 3 may determine that it is able to drive a fuel cell vehicle using power by a fuel cell system 100 of FIG. 1. In S103, the controller 500 may identify the amount of hydrogen charging of a hydrogen tank 110 of FIG. 3.

As the ignition is performed by means of the starting input device 50, in S104, the controller 500 may identify a state where the power of a low voltage battery 320 of FIG. 3 is applied to the E-BOP 60 of the fuel cell vehicle.

Next, in S105, the controller 500 may drive a high voltage battery 310 of FIG. 3 and may control such that a high voltage output from the high voltage battery 310 is applied to a BHDC 210 of FIG. 3.

Meanwhile, the controller 500 may determine that it is able to drive the fuel cell vehicle using power stored in the high voltage battery 310 or may drive the high voltage battery 310 to control such that a high voltage output from the high voltage battery 310 is applied to the BHDC 210 when the amount of hydrogen charging (e.g., the SOF) of the hydrogen tank 110 is less than 20%.

Next, in S106, the controller 500 may identify a voltage at an input terminal of an LDC 220 of FIG. 3.

When the voltage at the input terminal of the LDC 220 is less than 300 V, in S107, the controller 500 may determine that the amount of charging of the high voltage battery 310 is insufficient or that the state of the high voltage battery 310 is bad.

When the voltage at the input terminal of the LDC 220 is greater than 300 V, in S108, the controller 500 may determine that the state of the high voltage battery 310 is normal and may identify the amount of charging of the high voltage battery 310.

When the amount of charging of the high voltage battery 310 is greater than 85%, because the controller 500 is able to drive the fuel cell vehicle using the power of the high voltage battery 310 without driving the fuel cell system 100, in S109, it may drive the LDC 220 to control such that the low voltage battery 320 is charged.

When the amount of charging of the high voltage battery 310 is less than 85%, in S110, the controller 500 may identify the amount of charging of the low voltage battery 320.

When the amount of charging of the low voltage battery 320 is greater than 10%, because the controller 500 is able to drive the E-BOP 60 although not charging the low voltage battery 320, it may maintain a state where the low voltage battery 320 is not charged. In this case, as the low voltage battery 320 is not charged, because the low voltage battery 320 is not heated, the controller 500 may fail to drive a cooling device.

When the amount of charging of the low voltage battery 320 is less than 10%, in S111, the controller 500 may drive the cooling device to the maximum before driving the LDC 220 to control such that the low voltage battery 320 is charged.

Next, in S113, the controller 500 may drive the fuel cell system 100.

Next, in S114, the controller 500 may drive the LDC 220 to control such that the low voltage battery 320 is charged.

Next, in S115, the controller 500 may drive the LDC 220 while the fuel cell vehicle is traveling to control such that the low voltage battery 320 is charged while the amount of charging of the low voltage battery 320 is maintained as 80% to 85%.

Various embodiments of the present disclosure may be implemented as software (e.g., a program or an application) including instructions that are stored in a machine-readable storage medium (e.g., a memory). For example, the machine may invoke at least one of one or more instructions stored in the storage medium and may execute the invoked instruction. This allows the machine to be operated to perform at least one function according to the at least one instruction invoked. The one or more instructions may include a code generated by a complier or a code executable by an interpreter.

The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

According to an embodiment, a method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be divided and arranged in another component.

According to various embodiments, one or more of the above-mentioned components or operations may be omitted, or one or more other components or operations may be added.

Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

As described above, according to an embodiment, unnecessary power movement between the fuel cell system and the high voltage battery, which occurs in the starting sequence of the fuel cell vehicle, may be enhanced. Thus, stability of initialization settings of the fuel cell system may be improved according to reduced radiation noise due to a high current of an electronics line.

The present technology may enhance unnecessary power movement between the fuel cell system and the high voltage battery, which occurs in the starting sequence of the fuel cell vehicle, thus, improving stability of initialization settings of the fuel cell system based on reduced radiation noise due to a high current of an electronics line.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for managing power of a fuel cell, the apparatus comprising:
   a power conversion device configured to convert a high voltage into a low voltage, which is lower than the high voltage, and to supply the converted low voltage to a low voltage battery;
   a cooling device configured to flow a coolant to cool the power conversion device; and
   a controller configured to determine whether or not to drive the cooling device based on a remaining state of charge (SOC) of the low voltage battery, and to control the cooling device to be driven to cool the power conversion device based on a determination result of whether to drive the cooling device,
   wherein the power conversion device includes:
   a bidirectional high voltage DC-DC converter (BHDC) configured to drop a regenerative power to charge a high voltage battery, an operating voltage of which is higher than that of the low voltage battery, or to boost a power of the high voltage battery to supply the boosted power to an electrical load; and
   a low voltage DC-DC converter (LDC) configured to convert an output power of the BHDC into a low voltage to charge the low voltage battery, and
   wherein the controller drives the BHDC, and then drives the LDC to charge the low voltage battery when 1) a voltage at an input terminal of the LDC is higher than a certain voltage and 2) a remaining SOC of the high voltage battery is greater than or equal to a second SOC.

2. The apparatus of claim 1, wherein the controller controls to drive a low voltage electrical balance of plant (E-BOP) of a vehicle when an amount of charging of a hydrogen tank is greater than a certain remaining amount when the vehicle is started.

3. The apparatus of claim 1, wherein the controller drives the BHDC, and then drives the LDC to charge the low voltage battery when 1) a voltage at an input terminal of the LDC is higher than a certain voltage, 2) a remaining SOC of the high voltage battery is less than a second SOC, and 3) the remaining SOC of the low voltage battery is less than or equal to a first SOC.

4. The apparatus of claim 1, wherein the controller first drives the cooling device before driving the LDC.

5. The apparatus of claim 3, wherein the controller first drives the cooling device before driving the LDC.

6. The apparatus of claim 1, wherein the controller drives the BHDC, and then drives a fuel cell stack when 1) a voltage at an input terminal of the LDC is higher than a certain voltage, 2) a remaining SOC of the high voltage battery is less than a second SOC, and 3) the remaining SOC of the low voltage battery is greater than a first SOC.

7. The apparatus of claim 6, wherein the controller drives the fuel cell stack, and then drives the LDC such that an SOC of the low voltage battery is greater than the first SOC.

8. A method for managing power of a fuel cell, the method comprising:
   controlling driving of a power conversion device configured to convert a high voltage into a low voltage, which is lower than the high voltage, and supplying the converted low voltage to a low voltage battery;
   determine whether or not to drive a cooling device configured to flow a coolant to cool the power conversion device, based on a remaining state of charge (SOC) of the low voltage battery;
   controlling the cooling device to be driven to cool the power conversion device based on a determination result of whether or not to drive the cooling device;
   dropping, by a bidirectional high voltage DC-DC converter (BHDC), a regenerative power to charge a high voltage battery, an operating voltage of which is higher than that of the low voltage battery, or boosting, by the BHDC, a power of the high voltage battery to supply the boosted power to an electrical load;
   converting, by a low voltage DC-DC converter (LDC), an output power of the BHDC into a low voltage to charge the low voltage battery; and
   driving the BHDC, and then driving the LDC to charge the low voltage battery when 1) a voltage at an input terminal of the LDC is higher than a certain voltage and 2) a remaining SOC of the high voltage battery is greater than or equal to a second SOC.

9. The method of claim 8, further comprising:
   controlling to drive a low voltage E-BOP of a vehicle, when an amount of charging of a hydrogen tank is greater than a certain remaining amount when the vehicle is started.

10. The method of claim 8, further comprising:
    driving the BHDC, and then driving the LDC to charge the low voltage battery when 1) a voltage at an input terminal of the LDC is higher than a certain voltage, 2) a remaining SOC of the high voltage battery is less than a second SOC, and 3) the remaining SOC of the low voltage battery is less than or equal to a first SOC.

11. The method of claim 8, further comprising:
first driving the cooling device before driving the LDC.

12. The method of claim 10, further comprising:
first driving the cooling device before driving the LDC.

13. The method of claim 8, further comprising:
driving the BHDC, and then driving a fuel cell stack when 1) a voltage at an input terminal of the LDC is higher than a certain voltage, 2) a remaining SOC of the high voltage battery is less than a second SOC, and 3) the remaining SOC of the low voltage battery is greater than a first SOC.

14. The method of claim 13, further comprising:
driving the fuel cell stack, and then driving the LDC such that an SOC of the low voltage battery is greater than the first SOC.

15. The apparatus of claim 1, wherein the controller controls the cooling device to not be driven when the remaining SOC of the low voltage battery is greater than a first SOC.

16. The method of claim 8, further comprising:
controlling the cooling device to not be driven when the remaining SOC of the low voltage battery is greater than a first SOC.

* * * * *